Nov. 6, 1928.

U. S. JAMES 1,690,901

VIBRATOR

Filed Dec. 14, 1926

Inventor

Ulysses S. James

By [signature]

Attorney

Nov. 6, 1928.
U. S. JAMES
1,690,901
VIBRATOR
Filed Dec. 14, 1926   6 Sheets-Sheet 4
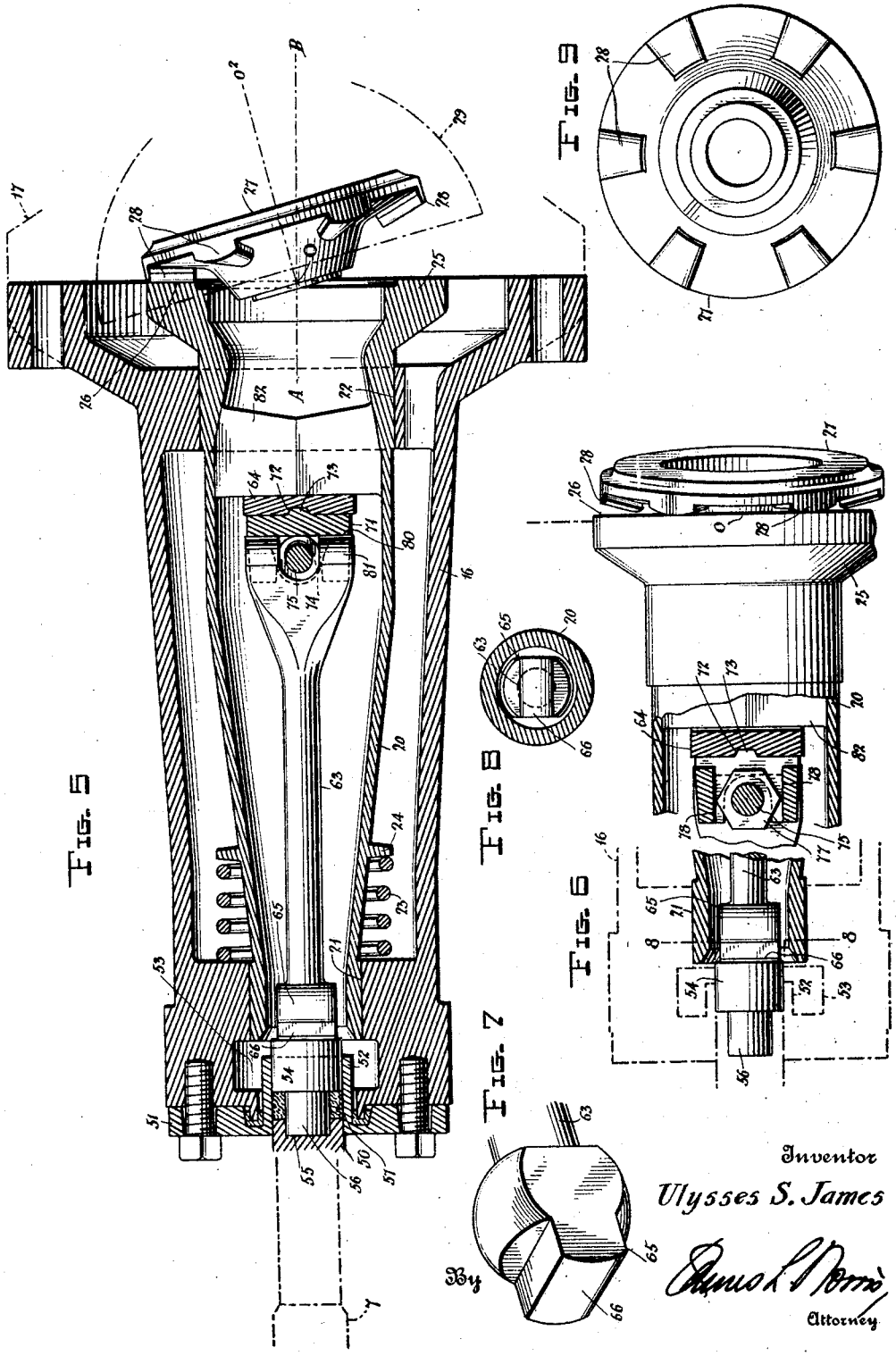
Inventor
Ulysses S. James
By
Attorney Nov. 6, 1928.

U. S. JAMES

VIBRATOR

Filed Dec. 14, 1926

Inventor

Ulysses S. James,

By

Attorney

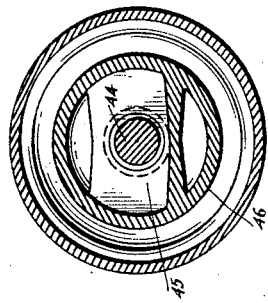
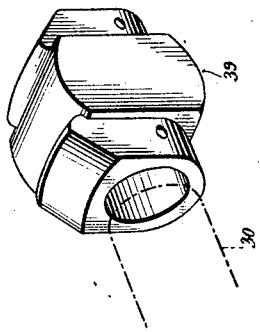
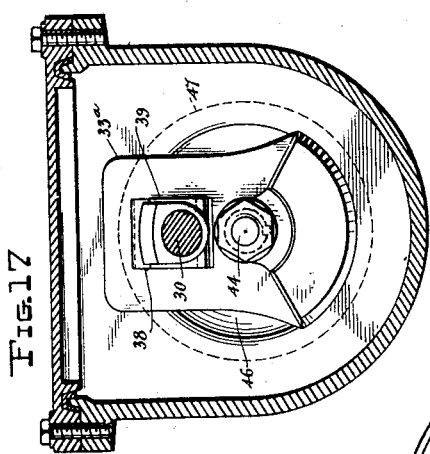
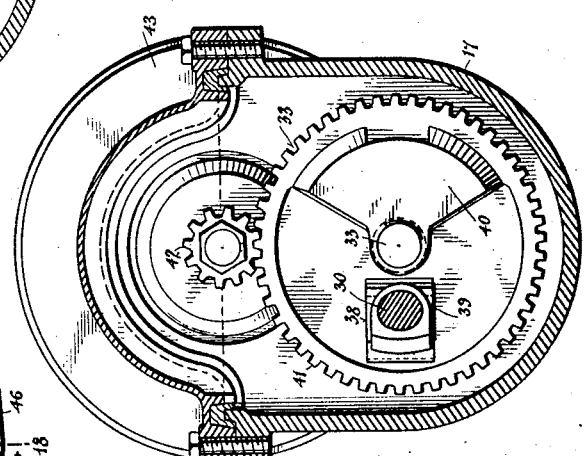
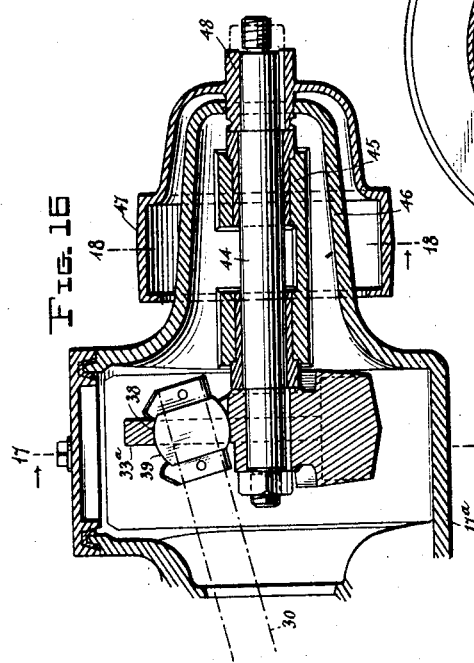
Inventor
Ulysses S. James

Patented Nov. 6, 1928.

1,690,901

UNITED STATES PATENT OFFICE.

ULYSSES S. JAMES, OF NEWARK, NEW JERSEY.

VIBRATOR.

Application filed December 14, 1926. Serial No 154,760.

The present invention relates to improvements in vibrators which are applicable to apparatus of different kinds requiring a vibratory action, and more especially to vibratory screens of the general class employed for the screening or separation of materials by passing them over a screen surface while subjected to a vibratory action.

The primary objects of the invention are, to provide a novel and improved vibrator of this general class whereby a steady train of rapid sharp impulses or vibrations is produced, the impulses or vibrations are of such intensity as to effectively overcome the inertia of the screen frame or other apparatus and to efficiently vibrate the same, notwithstanding that such frame or apparatus may be relatively heavy, the impulses or vibrations are produced efficiently from a relatively small amount of power applied to the vibrator, the intensity of the vibrations may be quickly and conveniently adjusted to suit different conditions, and the construction of the vibrator is such that great durability and uniformity in operation are attained.

To these and other ends, the invention consists in certain improvements and combinations and arrangements of parts all as will be hereinafter more fully described, the features of novelty being pointed out particularly in the claims at the end of the specification.

In the accompanying drawings:—

Fig. 3 represents on an enlarged scale, a longitudinal section through the vibrator on the line 3—3 of Fig. 2, the parts of the vibrator being shown at the limit of the forward stroke.

Fig. 4 is a view similar to Fig. 3, this figure showing the parts of the vibrator at the limit of the rearward or return stroke.

Fig. 5 represents on an enlarged scale a horizontal longitudinal section of the forward portion of the vibrator, illustrating the action of the gyrating head upon the vibratory plunger.

Fig. 6 is a diagrammatic view showing the gyrating head in a position where the vibratory plunger is retracted or at the limit of its return stroke and about to be driven forward under the action of the gyrating head.

Fig. 7 is a detail perspective view of the forward end of the member through which the strokes of the vibratory plunger are transmitted to the driven member of the vibrator.

Fig. 8 represents a cross section taken on the line 8—8 of Fig. 6, looking toward the right.

Fig. 9 is a detail view of the gyrating head showing the operating face thereof.

Fig. 14 represents on an enlarged scale a transverse section through the vibrator on the line 14—14 of Fig. 3.

Fig. 15 is a detail perspective view of the bearing on the rear end of the shaft of the gyrating head and which is engaged with the revolving driving wheel or member.

Fig. 16 represents a longitudinal section through the rear portion of the vibrator, modified to adapt it to receive power from a driving belt.

Fig. 17 represents a transverse section taken on the line 17—17 of Fig. 16.

Fig. 18 represents a transverse section taken on the line 18—18 of Fig. 16.

Similar parts are designated by the same reference characters in the several views.

Figure 1:
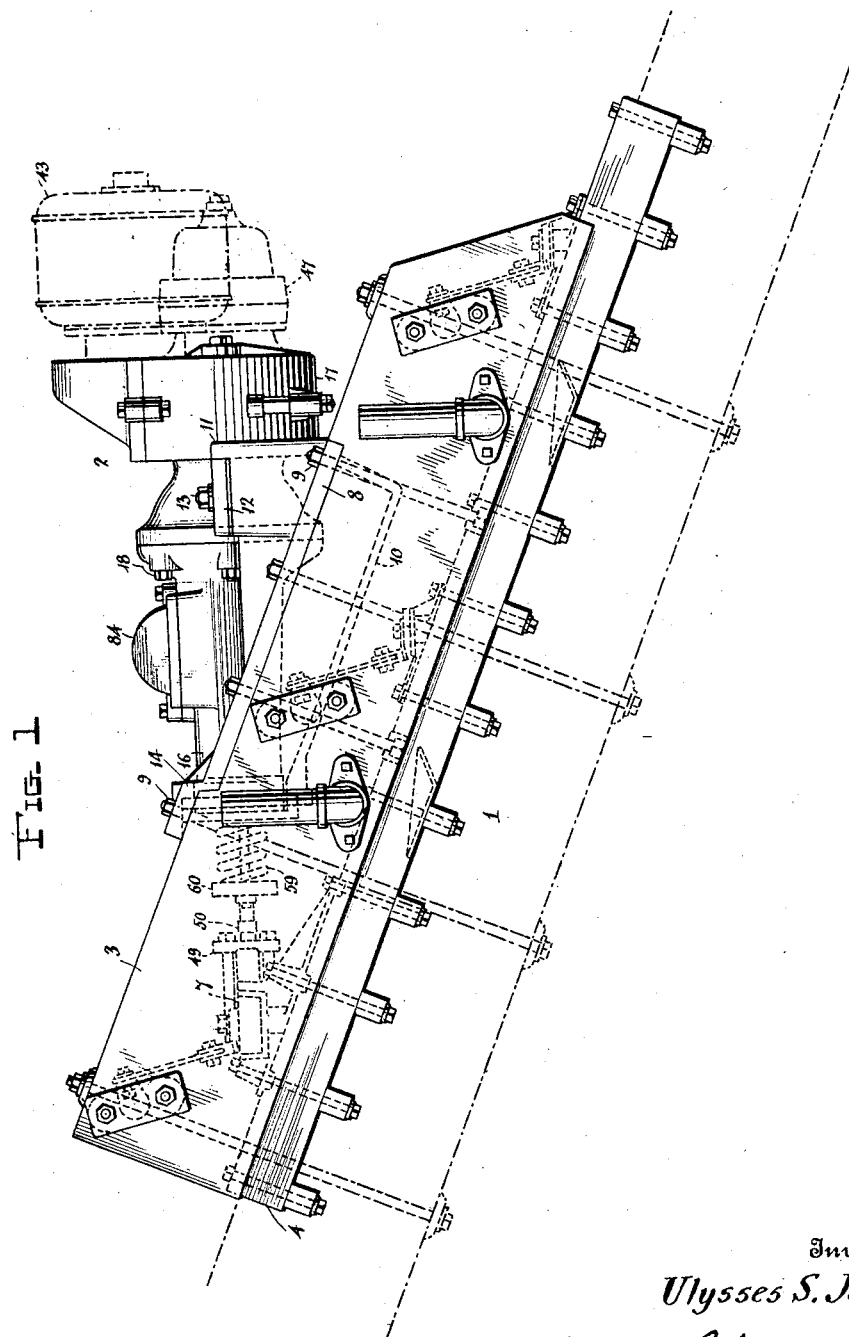
Fig. 1 is a side elevation of a vibratory screen equipped with a vibrator constructed in accordance with the present invention.

Vibrators embodying the present invention are applicable to many uses where it is desired to impart vibratory motion to apparatus of various kinds, although the vibrator as shown in the present instance is particularly applicable to vibratory screens. While the preferred embodiment of the invention is shown in the accompanying drawings and will be hereinafter described in detail, it is to be understood that the invention is not restricted to the precise construction shown as equivalent constructions are contemplated and such will be included within the scope of the claims.

In the present instance 1 designates generally a vibratory screen which may be of any kind or type and 2 designates generally a vibrator embodying the present invention and applied to such a screen. While the vibratory screen may be of any kind or type, that shown comprises a rigid frame comprising side members 3 and a vibratory frame 4 which carries the screen surface 5 and is suspended by the flexible hangers 6 so that it may vibrate between the side members of the frame. The vibratory frame of the screen has a bumper bar 7 fixed thereto, and the vibrator is preferably connected to the screen through the medium of this bumper bar.

Figure 2:
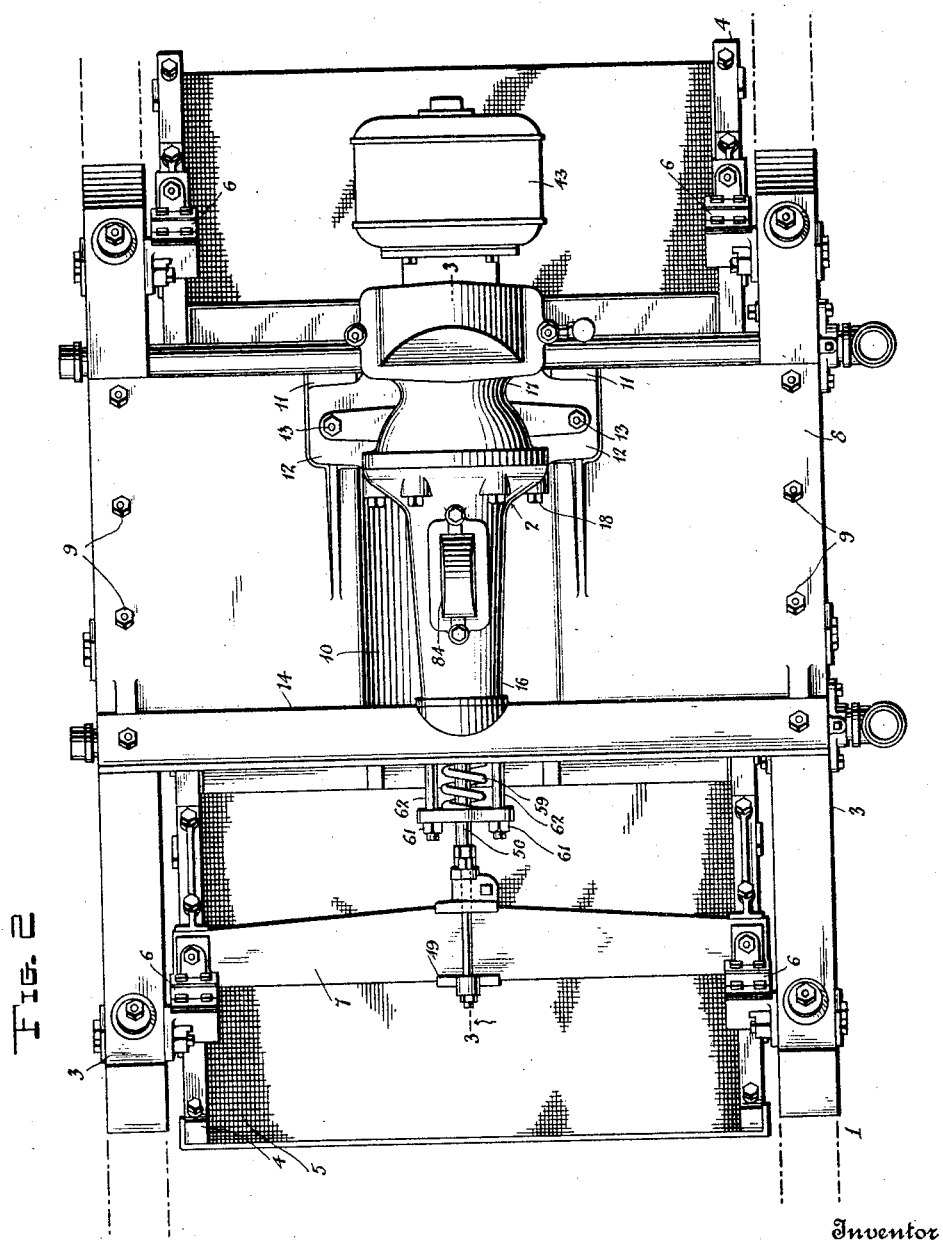
Fig. 2 is a top plan view of the screen and vibrator shown in Fig. 1.

The vibrator may be mounted in different ways with respect to the screen or other apparatus to which it is applied, but in applying the vibrator to screens, and especially to those of the sloping type, the vibrator is formed or provided with a relatively heavy base plate 8 which may, as shown in Fig. 2, extend laterally from the opposite sides of the vibrator so as to bridge the screen and the ends of the base plate rest on the relatively rigid stationary side members 3 of the screen frame, the base plate being immovably secured to the stationary screen frame by the bolts 9. The base plate is formed or arranged in such a plane with respect to the vibrator as to position the axis of the vibrator at the desired angle to the plane of the screen surface, this plate, in the present instance having an inclination which corresponds to the inclination of the screen surface while the axis of the vibrator is horizontal, or substantially so. The intermediate portion of the base plate 8 is preferably formed with a depression 10 in which the vibrator may rest and thus be accommodated, and the plate is formed, at opposite sides of this depression with shoulders or supports 11 on which arms 12 projecting from opposite sides of the vibrator may rest and be secured by bolts 13. The wall 14 at the forward end of the depression 10 is formed with an opening 15 through which the forward end of the vibrator may project. The depression 10 in the base plate may be utilized as a well to catch any oil that might drip from the vibrator thus avoiding damage to the cloth or other material used as a screen surface.

The vibrator comprises a casing which is preferably made in two parts 16 and 17, these parts being joined and secured together by bolts 18. The forward end of the section 16, which may be round or substantially so, is fitted into the opening 15 in the base plate 8, a packing ring 19 being fitted between these parts, if desired. A plunger 20 is mounted to reciprocate within the casing section 16, this plunger being preferably provided toward its forward and rear ends with cylindrical surfaces 21 and 22 which slidably fit corresponding guides formed in or cast as part of the casing section 16. A spring 23, which may encircle the forward portion of the plunger 20 and bear against a peripheral flange 24 formed thereon, acts to force the plunger rearwardly. The rear end of the plunger is preferably flanged or expanded to form a rim 25, the rear side of which forms an impact surface 26 which is annular in form and extends continuously around the axis of the reciprocatory plunger. This impact surface is shown as a plane surface perpendicular to the longitudinal axis or axes of reciprocation of the plunger, but it will be understood that this surface may be of conical or other form, if desired.

The casing section 17 contains the impact means which effects the reciprocations or vibrations of the plunger. The impact producing means, according to the present invention, embodies a gyratory head having projections thereon which successively engage the impact surface on the rear end of the plunger, during the gyratory movements of the head, and thereby impart a series or train of vibrations to the plunger. The gyrating head comprises preferably a bumper plate 27 having an annular series of projections 28 thereon, and a ram 29, this plate and ram being rigidly fixed on an operating shaft 30. The bumper plate 27 is preferably composed of a hardened steel to insure durability, and this plate is fitted solidly against the front of the ram 29. The ram is preferably composed of a solid casting of metal and it is of substantially hemispherical form to fit slidably into a correspondingly shaped bearing 31 formed in the casing. If desired, a facing of Babbitt metal or other suitable anti-friction metal 32 may be applied to the bearing 31 to insure conformity of fit between the ram and the casing and to minimize wear between these parts. The Babbitt metal facing may be conveniently cast in place between the ram and the casing, and when used, it provides a wear-sustaining lining. As shown, the portion of the shaft 30 on which the ram fits is tapered or conical and the ram and the bumper plate 27 are firmly locked on the shaft by a nut 30ª which is threaded on the forward end of the shaft and bears against the bumper plate, forcing the latter against the ram and tending to force the ram up on the taper of the shaft. This arrangement enables the bumper plate 27 to be removed or replaced in the event it becomes broken or otherwise unserviceable.

The projections 28 on the bumper plate are caused to successively engage the impact surface 26 on the rear end of the plunger 20, by imparting a gyrating motion to the ram 29, such motion of the ram being permitted by the spherical seat in which the ram fits. This gyratory motion will take place about the geometrical center of the spherical seat 31 as an axis, this axis being designated O in Fig. 5. Preferably this axis substantially coincides with the plane of the impact surface 26 on the rear end of the plunger. The projections 28 on the bumper plate are faced off so that their faces which engage the impact surface 26 are arranged radially of the center O or in other words the faces of these projections lie in the surface of a cone having the center O as its apex. Also the faces of the projections 28 are preferably rounded in a circumferential direction to conform with the rolling or rocking contact between these projections and the cooperative impact surface 26. Upon reference particularly to Figs. 5 and 6, it will be understood that gyratory motion of the ram shaft will cause corresponding motion of the ram and the bumper plate, and as the center O of this gyratory motion remains stationary, the bumper plate will roll around the abutment surface 26, thus bringing the projections 28 successively into engagement with this surface. As each projection engages the impact surface 26 on the plunger, the latter is forced forwardly against the action of its return spring 25, the plunger being shown at the limit of its forward motion under the action of one of the projections, in Fig. 5. Continuation of the gyratory motion causes the bumper plate to roll in relation to the abutment surface 26, the resulting change in the angularity of the bumper plate with respect to the surface 26 eventually bringing the gap between adjacent projections into operative relationship with the surface 26. The two adjacent projections 28 will then bear on the impact surface 26 at opposite sides of the radius O—o which represents the rolling line of contact between the bumper plate and the impact surface 26. When the bumper plate and plunger are in this relative position, the plunger will be at the limit of its rearward stroke. The spring 23 is always acting to yieldingly move the plunger rearwardly, and this spring retracts the plunger as each projection rides on the impact surface. As the radius O—o shifts around the impact surface 26, incident to the gyratory motion of the bumper plate, the next succeeding projection is brought into action, it forcing the plunger forwardly until the limit of its forward motion is reached, the radius O—o then being located medially of the operative projection, and as this radius shifts due to the continued gyratory motion of the bumper plate, the plunger begins to recede and it continues to recede until it reaches the limit of its rearward motion as is shown in Fig. 6, the impact surface 26 then resting against the projection which was in operation and the next succeeding projection on the bumper plate. Thus it will be understood that a train or series of reciprocations are imparted to the plunger 20 by continuous gyratory motion of the bumper plate. The number of projections 28 on the bumper plate may be varied to secure the desired frequency of the reciprocations for a given speed of gyration, and the projections are preferably spaced equidistantly in a direction circumferentially of the bumper plate in order that the reciprocations or vibrations will be regular or at uniform intervals. Furthermore, the axis $O—o^2$ preferably gyrates in a path which is conical and concentric with the axis A—B to which the impact surface 26 is perpendicular, in order that the range of the reciprocations, effected by the different projections, will be uniform throughout each gyration of the bumper plate.

Different means may be provided for gyrating the bumper plate and its ram. Preferably and as shown in the present instance, a rotary member 33 is employed which is mounted on a shaft 34 so that the center of rotation of this member is coincident with the axis A—B. This member, in the construction shown, is journalled on the inner end of the shaft 34, and the latter is securely fixed in the casing section 17 by a screw 35 which bears against a wall 36 of a recess formed in the shaft 34 and forces the shoulder 37 of the shaft against the casing section 17 and securely locks it in such position. The rotating member 33 is formed at one side of its center with a bearing 38 to receive a knuckle 39 which is loose on the rear end of the shaft 30. The knuckle is appropriately rounded at its inner and outer sides to fit correspondingly rounded surfaces of the bearing 38, thus allowing a relative rocking motion to take place between the shaft and the revoluble member, and the rear end of the shaft is journalled in the knuckle so that it may swivel therein. In the construction as just described, rotation of the member 33 will cause the shaft 30 to swing in a path which conforms with the surface of a cone whose axis is coincident with the axis of revolution of the member 33. While the member 33 revolves, the shaft 30 may be non-rotative on its own axis, as it is swivelled in the knuckle 39, or such relatively slight rotation of the shaft 30 may take place as is incident to the rolling of the bumper plate on the impact surface. The revoluble member 33 is preferably constructed so that it and the shaft 30 and related parts will be substantially balanced, thus avoiding undue wear on the shaft 34 and minimizing undesirable vibration. As shown, the member 33 is provided for this purpose with a counter weight 40 which is arranged thereon at the side opposite to the knuckle 39.

The motion imparted to the shaft 30 by the revoluble member 33 causes the bumper plate to act upon the impact surface 26 of the plunger in the manner hereinbefore described, to effect reciprocations of the plunger, and in order to enable the bumper plate to impart these impulses to the plunger with a minimum shock to the mechanism, the ram 29 which solidly backs the bumper plate is preferably composed of a heavy solid metal casting or body which possesses a sufficient amount of inertia to resist or sustain substantially the re-actions produced on the bumper plate incident to the bumping of its projections against the plunger. This ram is also firmly seated in a large bearing surface in the bearing 31 which is a rigid part of the casing section 17. The centrifugal force developed by the motion of the shaft 30 in a conical path is utilized more or less as the force which resists or opposes the re-action or rebound incident to the engagement of the projections of the bumper plate with the impact surface on the plunger, and the ram 29, shaft 30 and knuckle 39 may be so proportioned with respect to the speed at which the revolving member 33 is driven as to cause the centrifugal force developed by these parts to equal and balance the re-action forces imposed upon the bumper plate incident to the engagement of the projections with the impact surface of the plunger. In either case, the centrifugal force developed by the shaft 30 and its associated parts, serves in whole or in part to sustain the re-action forces imposed by the plunger on the bumper plate so that the principal work to be done by the revolving member 33 is to swing the shaft 30 in its conical path. The amount of power required to drive the member 33 is therefore relatively small.

Figure 12:
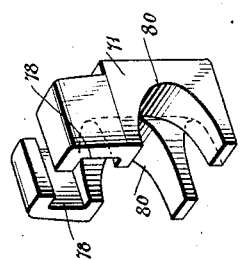
Fig. 12 is a detail perspective view of the slide in which the end of said member fits.
Figure 11:
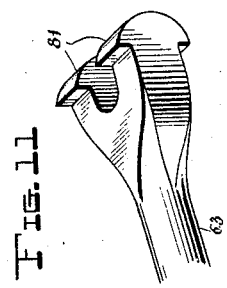
Fig. 11 is a detail perspective view of the rear end of the member which transmits the vibratory impulses from the vibratory plunger to the driven member of the vibrator
Figure 10:
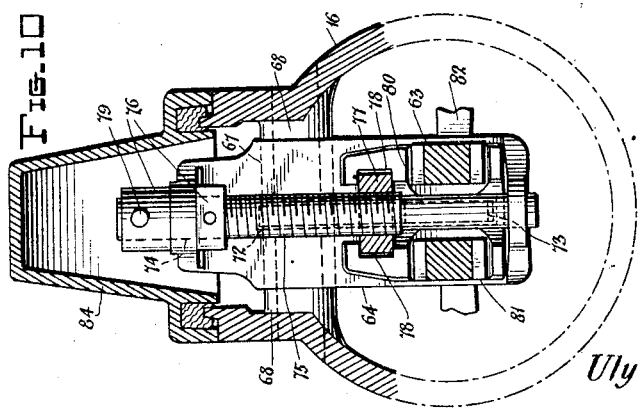
Fig. 10 represents on an enlarged scale a cross section through the vibrator, on the line 10—10 of Fig. 3, illustrating in detail the stroke adjusting means.

The member 33 may be driven in different ways. As shown in Figures 3, 4, and 14, this member is provided with gear teeth 41 to mesh a pinion 42 on the shaft of a suitable electric motor 43, the latter being preferably bolted directly to the rear end of the casing section 17. Figures 16, 17 and 18, however, show an arrangement wherein the member 33ᵃ corresponding with the member 33 in Figures 3, 4 and 12 may be driven directly by a belt which receives power from a shaft or other source. In this instance the member 33ᵃ is fixed on a shaft 44 which is journalled to revolve in a bearing 45 formed in an extension 46 on the rear of the casing section 17ᵃ. A belt pulley 47 surrounds the extension 46 of the casing and its hub 48 is off-set beyond the end of the casing extension 46 and is fixed on the outer end of the shaft 44. In this instance the vibrator is driven by a belt running on the belt pulley 47, the construction and mode of operation of the vibrator being otherwise substantially the same as has been described.

The vibratory motions of the plunger could be transmitted directly to the screen or other part to be vibrated, but it is preferable to provide means whereby the range or extent of the vibrations transmitted from the vibrator may be varied. Accordingly, means is provided between the reciprocatory plunger which receives its motion from the bumper plate and the member which imparts the desired vibrations to the screen or other mechanism to be vibrated, whereby the range or extent of these vibrations may be varied or adjusted.

In the construction shown, the bar 7 of the screen or other apparatus to be vibrated is equipped with a clamp 49 in which is threaded or to which is otherwise fixed a rod 50, and this rod serves as the member through which the vibrations produced by the vibrator are transmitted to the screen or other apparatus. The rear end of the rod 50 preferably rests movably in a plate 51 which may be secured, as by the screws shown, to the forward end of the casing section 16, and this plate is formed with a stuffing box or sleeve 52 which extends into an oil collecting well 53 which may be provided within the forward end of the section 16. The inner end of the rod 50 is preferably provided with an anvil 54 composed preferably of a hardened metal, this anvil being also movable longitudinally within the stuffing box or sleeve 52 of the plate 51. The rear end of the rod 50 is preferably formed with a recess 55 to receive the forward end of a stem 56 formed on the anvil, and a packing 57 may be placed around the stem 56 and between the opposed faces of the rod 50 and the anvil so that a longitudinal compression of the rod 50 against the anvil will expand the packing radially and thus form an oil seal within the stuffing box 52. The packing is preferably maintained under compression, for which purpose the rod 50 is provided with a spring seat 58 against which a compression spring 59 bears, the opposite end of this spring bearing against a plate 60 which may be drawn toward the forward end of the vibrator by adjustment of nuts 61 threaded on the forward ends of studs 62, the latter being threaded into or otherwise secured to the forward end of the casing section 16.

Figure 13:
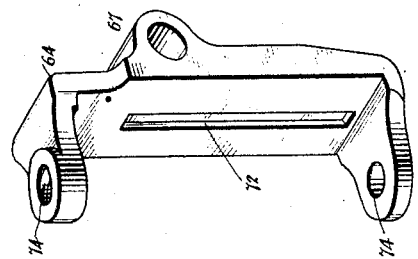
Fig. 13 is a detail perspective view of the rocker which is pivotally mounted on the vibratory plunger and supports the slide shown in Fig. 12 for adjustment therein whereby the length of the strokes imparted to the driven vibratory member may be varied.

The vibratory or reciprocatory movements are transmitted from the plunger 20 to the member 54 on the rod 50 by a thrust member 63 and a cooperative stroke adjusting rocker 64. The member 63, which is preferably in the form of a bar, is accommodated within the hollow plunger 20 and it extends longitudinally therein. The forward end of this member has a substantially spherical head 65 thereon which fits loosely and is thus centered within the forward end of the plunger 20 although allowing the member 63 to rock relatively to the plunger, and the forward end of this head preferably has a boss 66 thereon the forward surface of which is preferably rounded as shown in Fig. 7 and bears against the rear of the anvil 54. The rocker 64, which is shown in detail in Fig. 13, has an apertured ear 67 at its rear side which fits between apertured lugs 68 formed in the upper portion of the casing section 16 above the plunger 20 therein and immediately below an opening 69 formed in the top of the casing section, and pivot pin 70 extends through these lugs and ear and thus pivotally mounts the rocker in the casing section 16 so that the rocker may swing to and fro in a plane parallel to the line of reciprocation of the plunger 20. The rocker is adapted to receive a slide 71, it having a groove 72 formed in its rear wall to receive a rib 73 formed on the rear side of the slide, and a screw 75 is rotatably fitted in apertures 74 formed in arms which extend forwardly at the upper and lower ends of the rocker. The screw is provided with thrust collars 76 which are fixed thereto at opposite sides of the upper arm of the rocker to prevent endwise movement of the screw, and the threaded portion of the screw engages a nut 77 which is fitted in opposed grooves 78 formed in the top of the slide 71. A handle 79 is attached to the upper end of the screw to provide means for rotating it, this handle being above the opening 69 is the casing section 16 where it may be easily reached for manipulation. Rotation of the screw will raise or lower the slide 71 and thereby alter the distance between this slide and the pivot 70 on which the rocker swings. The slide 71 is operatively connected to the thrust member 63 so that the slide will provide an operative connection between said member and the rocker. Preferably and as shown, the forward face of the slide 71 is formed with a rounded recess 80 into which the rounded portions 81 at the rear end of the member 63 are adapted to fit and thus form a joint which permits relative pivoting movement between said member and the rocker. The slide 71 is forked or recessed and the rear end of the member 63 is recessed in line therewith so that the screw 75 may extend through these parts without interference therewith and also the screw will prevent lateral displacement of the slide or the rear end of the member 63 from the slide. The rocker is operatively connected to the reciprocatory plunger 20 by an abutment 82 which may be cast as a web extending across the hollow interior of the plunger or it may be otherwise fixed therein so that it bears against the rear side of the slide as appears clearly in Figures 3 and 4. The rocker extends downwardly through an opening 83 in the top of the plunger 20, and the rear end of the member 63 may extend upwardly into this opening when certain stroke adjustments are made. The opening 69 in the top of the casing sections 16 and the screw adjusting handle 79 are normally covered by a cap 84 which may be bolted or otherwise removably held in place although it may be easily and quickly removed to afford access to the screw adjusting handle 79 when a stroke adjustment is to be made.

By rotation of the screw 75 in one or the other direction, the slide 71 will be raised or lowered on the rocker 64. Figs. 3 and 4 show in full lines the slide in its lowermost position on the rocker, and when the slide occupies this position, the full or maximum length of stroke will be transmitted from the plunger 20 to the member 50, as the abutment 82 and the rear end of the member 63 are substantially equidistant from the pivot 70 about which the rocker swings. When it is desired to reduce the length of the strokes transmitted to the member 50 which is attached to the screen or other apparatus to be vibrated, the screw is rotated in a direction to raise the slide 71, thus bringing the rear end of the member 63 closer to the pivot 70 about which the rocker swings and thus reducing the length of the stroke imparted to the member 63 relatively to the stroke of the plunger 20. Any desired adjustment of the length of the stroke may be made from the full stroke received from the plunger 20 to an almost zero stroke, by properly setting the slide 71 by manipulation of the screw. The dotted lines in Fig. 3 show the member 63 and slide 71 adjusted for a relatively short stroke.

The spring 59 serves not only to maintain the packing 57 under compression, as has been hereinbefore described, but it also acts to force the bar 50 rearwardly or on its return strokes; it holding the anvil 54 in contact with the rib 66 on the forward end of the member 63, it holds the rocker surfaces on the rear end of the member 63 in contact with the seat 80 in the slide 81, it holds the lower end of the rocker against the abutment 82 on the plunger 20, and it assists the spring 23 in forcing the plunger rearwardly on its return strokes and holding the impact surface 26 on the plunger in contact with the bumping projections on the bumper plate. The rearward thrust received by the bumper plate is sustained by the ram 29 which has a large bearing in the solidly supported seat 31.

The mode of operation of a vibrator constructed as hereinbefore described is as follows:—Assuming that the vibrator is properly mounted and is connected to a screen or other apparatus to be vibrated, by a clamp or other suitable means, rotation of the member 33 either by the electric motor or the belt pulley shown will cause the shaft 30 to gyrate or swing in a path which conforms with the surface of a cone the axis of which is coincident with the axis A—B and whose apex is coincident with the center O, Fig. 5. As a consequence, the ram 29 will be gyrated in its seat 31 and the bumper plate 27 will gyrate in unison therewith. The gyrating motion of the bumper plate causes the projections 28 on its forward face to successively engage the impact surface 26 on the rear end of the plunger 20; as a consequence the plunger 20 is driven forwardly as each projection comes into engagement with the impact surface, and the plunger 20 recedes as such projection recedes passing through its cycle of gyrations. The plunger reaches its release position at the moment the impact surface bears upon the projection which next acts to force the plunger forwardly as shown in Fig. 6. Continuous rotation of the member 33 causes the projections 28 to act on the plunger 20 at the desired frequency with the result that the plunger 20 receives a vibratory motion in the direction of its length.

The vibratory motion of the plunger 20 is transmitted to the rocker 64 by the abutment 82, and vibratory motion is transmitted from the rocker 64 through the slide 71 and thrust member 63 to the anvil 54 on the rear end of the bar 50, the latter being attached to the screen or other apparatus to be vibrated. While the range of reciprocatory or vibratory motion of the plunger 20 will be constant under the action of the bumper plate, the range of reciprocation or vibration imparted to the bar 50 is variable by adjustment of the screw 75 which varies the distance between the slide 71 and the pivot 70 of the rocker. This adjustment enables the vibrator to be accommodated to apparatus of different kinds by adjusting the stroke thereof as different conditions may require, and it enables the vibrator to be adjusted to conform with the requirements of different conditions existing in the operation of the screen or apparatus to which the vibrator is attached.

A vibrator constructed in accordance with the present invention is capable of imparting vibrations of relatively high frequency to vibrating screens and other apparatus where such motion is desirable, so that while the vibratory part of the apparatus, which, with its added load, may be relatively heavy, will be vibrated efficiently, the vibration which drives it will be relatively free of vibration and hence it may be mounted directly on the stationary framework of the apparatus without transmitting destructive vibration thereto.

In the example of the invention shown, the gyratory bumper plate is provided with six impulse or impact producing projections so that the gyratory movements of the plate may be at the relatively low rate of 300 per minute in order to vibrate the driven element at the relatively high rate of 1800 per minute. Of course it will be understood that the number of impulse producing projections or the speed at which the bumper plate is gyrated may be increased or reduced as desired, to increase or decrease the frequency of the vibrations.

The ram, ram shaft and revoluble member which gyrate the bumper plate counteract, in whole or in part, the reaction thrusts produced on the bumper plate by the plunger, thereby absorbing within the vibrator itself most of the undesired vibrations which would otherwise arise, as well as reducing the load upon the motor or other driving means so that the vibrator requires a small amount of power to operate it. By arranging the various elements of the vibrator in alinement, the forces and stresses are sustained effectively without lateral deflection.

The stroke-adjusting means by which the length of the vibratory strokes of the driven element may be varied, as desired, is accessible so that it may be reached conveniently, and it may be easily and quickly adjusted without the necessity of stopping the operation of the vibrator or the apparatus to which it is applied, thus enabling the operator to observe the effect of the adjustments upon the operation of the screen or other apparatus while the same continues in operation.

I claim as my invention:—

1. A vibrator comprising a vibratory element, a member having a gyratory motion in an orbit around the axis of vibration of said element and means operative by said gyratory motion to vibrate said element.

2. A vibrator comprising a vibratory element, and a member having a gyratory motion in an orbit around the axis of vibration of said element, one of said parts having portions thereon which project toward and successively engage the other part to vibrate said element.

3. A vibrator comprising a vibratory element, and a member having a gyratory motion in a conical path relatively to said element, one of said parts having an impact surface thereon and the other part having an annular series of projections arranged to successively engage said impact surface in consequence of the relative gyratory motion between the parts.

4. A vibrator comprising a vibratory element having an annular impact surface thereon extending transversely of its direction of vibration, and a member mounted to gyrate in a conical path relatively to said surface and having an annular series of projections thereon which are successively brought into action against said surface in consequence of said gyration.

5. A vibrator comprising an axially reciprocable plunger having a transversely arranged impact surface thereon concentric with its axis, and a member mounted to gyrate relatively to said plunger about an axis coincident with the axis thereof and having bumping means thereon arranged to successively strike said surface during the gyratory motion of said member.

6. A vibrator comprising a longitudinally vibratory element, a ram mounted to gyrate in an orbit about the longitudinal axis of said element, and means operative in consequence of said gyratory motion of the ram to impart vibrations to said element.

7. A vibrator comprising a vibratory element, a ram having a spherical bearing surface, a bearing in which the spherical surface of the ram is seated, means for imparting a gyratory motion to the ram in an orbit about a radius of its seat, and means operative in consequence of the gyratory motion of the ram to impart vibratory motion to said element.

8. A vibrator comprising a vibratory plunger, a seat opposite to one end of the plunger and having a spherical bearing surface concentric with the axis of the plunger, a ram mounted to gyrate in said seat in an orbit about the axis of the plunger as a center, and means interposed between the plunger and ram and operative in consequence of the gyrating motion of the latter for imparting vibratory motion to said plunger.

9. A vibrator comprising an axially vibratory plunger, a ram mounted opposite to an end of the plunger to gyrate in an orbit about the axis thereof, and a bumper plate mounted to gyrate in unison with the ram and operative, in consequence of its gyratory motion, to impart vibratory motion to the plunger, the bumper plate seating against and being sustained by the ram.

10. A vibrator comprising a casing, an element mounted to vibrate longitudinally therein, the casing having a seat therein opposite to an end of said element, a ram mounted to gyrate in said seat in an orbit about the longitudinal axis of said element, and a bumper plate supported on the face of the ram and cooperative with the adjacent end of said element to vibrate it in consequence of the gyratory motion of the ram.

11. A vibrator comprising an axially vibratory plunger having an annular impact surface on an end thereof and concentric with its axis, a bumper plate opposite to said surface and having impact-producing projections thereon at the side thereof toward said surface, and means for relatively rolling the bumper plate on said impact surface whereby the projections on said plate successively strike said surface.

12. A vibrator comprising a vibratory element, a bumper plate having a series of impact-producing projections thereon, and means for imparting a predetermined gyratory motion to said plate in an orbit about the direction of vibration of said element and thereby cause the projections thereon to successively strike said element.

13. A vibrator comprising a longitudinally vibratory element, a bumper plate having a series of impact-producing projections thereon, and means for gyrating said plate by swinging its axis in a path which conforms with the surface of a cone whose apex is coincident with the longitudinal axis of said element whereby the projections on said plate are caused to successively strike said element and thereby vibrate it.

14. A vibrator comprising a vibratory element, a gyratory member, one of said parts having an impact surface thereon and the other part having impact-producing projections thereon arranged to successively strike the impact surface in consequence of the gyratory motion of said member, a shaft fixed to said member, and a revoluble member operative to swing said shaft in a conical path to gyrate said gyratory member.

15. A vibrator comprising a vibratory element, a ram mounted to gyrate in a conical path relatively to said element, means interposed between the ram and said element and operative, in consequence of the gyratory motion of the ram, to vibrate said element, a shaft fixed to the ram and having an end projecting therefrom and means for swinging the projecting end of said shaft in a circular path to gyrate the ram.

16. A vibrator comprising a vibratory element, a member mounted for gyratory motion in a conical path relatively to said element, means being provided between said element and member for imparting vibrations to said element in consequence of said gyratory motion of said member, and means for imparting said gyratory motion to said member and for counteracting the reaction imposed upon said member.

17. A vibrator comprising a longitudinally vibratory element, means for vibrating it, a driven vibratory element alined with said vibratory element, and means interposed between said elements for relatively varying the lengths of the vibratory strokes thereof.

18. A vibrator comprising a longitudinally vibratory element having means for vibrating it, a driven vibratory element alined longitudinally with said vibratory element, and variable-leverage means connecting said elements for transmitting the vibrations of said vibratory element to said driven element.

19. A vibrator comprising a longitudinally vibratory driving element having means for vibrating it, a driven element alined longitudinally therewith, a member to drive the driven element, and a rocker operative by said driving element and having means to act with variable leverage on said driven element.

20. A vibrator comprising a hollow longitudinaly vibratory driving element having means for vibrating it, a driven element alined longitudinally with said driving element, a member arranged longitudinally within the hollow driving element to act on said driven element to drive it, a rocker driven by said driving element, and a slide adjustable on the rocker in a direction toward and from its pivot and operative on said member to actuate it.

21. A vibrator comprising a vibratory driving element, an actuator operative to move said element in one direction, a spring acting on said element to maintain it in cooperative relation with its actuator, a driven element, a member bearing against it to actuate it in one direction, means actuated by said driving element and bearing against said member for actuating it, and a spring acting on said driven element to hold it against said member and for holding the latter against the actuating means.

22. A vibrator comprising a casing having an opening therein, a hollow plunger mounted to reciprocate axially in the casing and having an opening therein opposite to that in the casing, means for imparting vibrations to said plunger, a driven element, a member contained in the plunger and acting at one end against the driven element, a rocker pivoted to the casing adjacent to the opening therein and projecting through the opening in the plunger to the interior of the latter, means for swinging the rocker in accordance with the vibrations of said plunger, and means on the rocker, accessible for adjustment through the opening in the casing, for transmitting vibrations of variable stroke to said member to vibrate said driven element.

23. A vibrator comprising a casing having a vibration-imparting means therein, a driven element, a stuffing box fitted to the casing and into which an end of said element extends, an anvil abutting against said end of the driven element and forming a circumferential recess between it and the adjacent end of said element, a packing contained in said recess, and a spring acting on said driven element to axially compress and radially expand said packing within the stuffing box.

24. A vibrator comprising a casing, a plunger mounted to vibrate longitudinally therein, a driven element mounted in the forward end of the casing in alinement with the plunger, means for transmitting vibratory motion from the plunger to said driven element, an actuator arranged in alinement with the plunger and operative against its rear end to vibrate it, and driving means for said actuator located in rear of the latter and in alinement therewith.

In testimony whereof I have hereunto set my hand.

ULYSSES S. JAMES.